(12) United States Patent
Bhatnagar et al.

(10) Patent No.: US 12,706,825 B2
(45) Date of Patent: Aug. 11, 2026

(54) SYSTEM AND METHOD FOR ENABLING SPEED TEST OF INTERNET CONNECTION USING MOBILE APPLICATION

(71) Applicant: JIO PLATFORMS LIMITED, Ahmedabad (IN)

(72) Inventors: Aayush Bhatnagar, Navi Mumbai (IN); Pradeep Kumar Bhatnagar, Navi Mumbai (IN); Sundaresh Sankaran, Mumbai (IN); Haresh B Ambaliya, Amreli (IN); Anjali Tripathi, Indore (IN); Anmol Neema, Indore (IN); Bhoopendra Thakur, Indore (IN); Asha Sharma, Navi Mumbai (IN); Premprakash Bhakar, Thane (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 39 days.

(21) Appl. No.: 18/881,435

(22) PCT Filed: May 27, 2024

(86) PCT No.: PCT/IN2024/050617

§ 371 (c)(1),
(2) Date: Jan. 6, 2025

(87) PCT Pub. No.: WO2025/004079

PCT Pub. Date: Jan. 2, 2025

(65) Prior Publication Data

US 2025/0233820 A1 Jul. 17, 2025

(30) Foreign Application Priority Data

Jun. 30, 2023 (IN) ............................ 202321043899

(51) Int. Cl.
*H04L 43/10* (2022.01)
*H04L 43/0852* (2022.01)
(Continued)

(52) U.S. Cl.
CPC .......... *H04L 43/10* (2013.01); *H04L 43/0852* (2013.01); *H04L 43/0888* (2013.01); *H04L 43/50* (2013.01)

(58) Field of Classification Search
None
See application file for complete search history.

(56) References Cited

U.S. PATENT DOCUMENTS

2015/0032851 A1* 1/2015 Lieber .................. H04L 65/762 709/219
2015/0358225 A1 12/2015 Zawari
(Continued)

FOREIGN PATENT DOCUMENTS

CN 104378451 A 2/2015
WO 2025004079 A1 1/2025

OTHER PUBLICATIONS

International Search Report and Written Opinion for application No. PCT/IN2024/050617 mailed on Sep. 5, 2024, 6 pages.

*Primary Examiner* — Tonia L Dollinger
*Assistant Examiner* — Ishrat Rashid
(74) *Attorney, Agent, or Firm* — FINNEGAN, HENDERSON, FARABOW, GARRETT & DUNNER LLP

(57) ABSTRACT

The present disclosure provides system (102) and method (300) for enabling speed test of internet connection using a mobile application. The mobile application selects an appropriate server and initiates the data transfer by sending and receiving packets of data to and from the server. The data size and duration of the test can vary, but larger sample sizes
(Continued)

300
Start Test 302
User initiates speed test with X thread and Y buffer size 304
Select server for the speed test 306
Establish connection with the selected nearest server 308
Prepare for the speed test: -Check network connection 310
312
Start data transfer between the mobile device and server with multiple thread and buffer size and increase X thread once reach speed threshold with 2Y buffer size
Threshold will get increase every time as per network speed 314
Measure time taken for data transfer in both upload and download directions 316
Calculate upload and download speeds based on the measured time and data transferred 318
Display speed test results to the user 320
End generally provide more accurate results therefore multiple threads with increasing buffer size are used during the test time. The system measures the time it takes for the data transfer to complete in both the upload and download directions. The timing is crucial for determining the speeds. A speed test empowers users with the ability to measure, evaluate, and understand the performance of the internet connection. Thus, enabling the users to make informed decisions and ensure they receive reliable and satisfactory internet service.

12 Claims, 7 Drawing Sheets

(51) Int. Cl.
*H04L 43/0888* (2022.01)
*H04L 43/50* (2022.01)

(56) References Cited

U.S. PATENT DOCUMENTS

2016/0294656 A1* 10/2016 Tse .......................... H04L 43/16
2018/0206136 A1* 7/2018 Chow ................. H04L 43/0876

* cited by examiner

SYSTEM AND METHOD FOR ENABLING SPEED TEST OF INTERNET CONNECTION USING MOBILE APPLICATION

RESERVATION OF RIGHTS

A portion of the disclosure of this patent document contains material, which is subject to intellectual property rights such as, but are not limited to, copyright, design, trademark, Integrated Circuit (IC) layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF DISCLOSURE

The embodiments of the present disclosure generally relate to testing and measurement of network performance. In particular, the present disclosure relates to a system and method for enabling speed test of internet connection using mobile application.

BACKGROUND OF DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

As internet usage expanded and broadband services became more prevalent, there was a growing demand for a standardized method to measure and evaluate internet speed and quality. Speed tests can be traced back to a provider on the internet and the need for users to assess the performance of their internet connections.

Speed tests are designed to assess the speed and quality of an internet connection by measuring the data transfer rates between a user's device and a remote server. These tests provide valuable information about the upload and download speeds, latency, and overall stability of the internet connection. Speed tests are also relevant for mobile networks, where users assess the performance of their cellular data connections. Mobile network operators use speed tests to evaluate network coverage, capacity, and overall user experience, allowing them to optimize their infrastructure and offer better service to customers.

Patent document number U.S. Pat. No. 11,558,278 titled "method and apparatus for initiating internet connection speed testing on a residential gateway" discloses initiating the test in response to a request. The request pertains to initiate a test of an internet connection speed by a residential gateway and a test server are endpoints for an exchange of test data used to measure the internet connection speed. Further, measuring a speed of the exchange of the test data. Another patent document number CN109218133 titled "network speed testing system, method, device and computer readable storage medium" discloses network speed testing system. Once the node equipment obtains the corresponding speed measurement task from the server, the node equipment is matched with the other node equipment establishes a communication connection and performs speed measurement. Further, obtains speed measurement data, and sends the obtained speed measurement data to the server. The server calculates a speed measurement result corresponding to the node equipment according to the speed measurement data.

Conventional systems and methods face difficulty in selection of managing multiple radio nodes in an optimized manner. There is, therefore, a need in the art to provide a method and a system that can overcome the shortcomings of the existing prior arts.

OBJECTS OF THE PRESENT DISCLOSURE

Some of the objects of the present disclosure, which at least one embodiment herein satisfies are as listed herein below.

An object of the present disclosure is to provide a system and method for enabling speed test of internet connection using mobile application.

An object of the present disclosure is to assess the performance of internet connection by measuring the download and upload speeds, as well as factors such as latency and jitter.

An object of the present disclosure is to compare the speeds and performance of various providers, an informed decision about the most suitable option for the user's requirement can be made.

An object of the present disclosure is to determine the issue persisting in the internet connection.

SUMMARY

In an exemplary embodiment, a method for performing a network speed test is described. The method comprises initiating, by a user, the speed test with a number of threads and a buffer size through an application interface of a user device and selecting, by a processor, a nearest server from a list of servers based on geographical location of the user and a network site location. The network site location is determined based on a mobile country code (MCC), a mobile network code (MNC) and cell identity (ID). The method comprises establishing, by the processor, a connection between the selected server and the user device and preparing, by the processor, for the speed test by checking a network connection. The method comprises starting, by the processor, transfer of a defined amount of data packets between the user device and the selected server with a plurality of threads and buffer size for a defined time interval. The method further comprises on reaching a speed threshold between the time interval, increasing the number of threads with two times of the buffer size. The method comprises measuring, by the processor, a time taken for transfer of data packets in an upload direction and a download direction and calculating, by the processor, an upload speed and a download speed based on the measured time and transferred data. A throughput and latency of the connected network is measured. The method comprises displaying, by the processor, results of speed test to the user via the application interface. The results of the speed test include the upload speed, the download speed, the throughput, and the latency.

In some embodiments, the speed threshold is increased according to network speed.

In some embodiments, the time interval and size of data packets are defined according to network type.

In some embodiments, the method further comprises evaluating, by the processor, a plurality of network parameters. The plurality of network parameters includes network coverage, network capacity, quality.

In some embodiments, the speed is defined by data transmitted/time taken for transfer of data packets.

In another exemplary embodiment, a system for performing a network speed test is described. The system comprising a processing engine configured to initiate the speed test with a number of threads and a buffer size through an application interface of a user device and select a nearest server from a list of servers based on geographical location of the user and a network site location. The network site location is determined based on a mobile country code (MCC), a mobile network code (MNC) and cell identity (ID). The processing engine is configured to establish a connection between the selected server and the user device and prepare for the speed test by checking a network connection. A micro service module is configured to start transfer of a defined amount of data packets between the user device and the selected server with a plurality of threads and buffer size for a defined time interval. On reaching a speed threshold between the time interval, the processing engine is configured to increase the number of threads with two times of the buffer size. A calculation module is configured to measure a time taken for transfer of data packets in an upload direction and a download direction and calculate an upload speed and a download speed based on the measured time and transferred data. A throughput and latency of the connected network is measured. The processing engine is configured to display results of speed test to the user via the application interface. The results of the speed test include the upload speed, the download speed, the throughput, and the latency.

In some embodiments, the speed threshold is increased according to network speed.

In some embodiments, the time interval and size of data packets are defined according to network type.

In some embodiments, the processing engine is further configured to evaluate a plurality of network parameters. The plurality of network parameters includes network coverage, network capacity, quality.

In some embodiments, the speed is defined by data transmitted/time taken for transfer of data packets.

In another exemplary embodiment, a user device for performing a network speed test is described. The user device is communicatively coupled to a system. The coupling comprises steps of initiating a speed test with a number of threads and a buffer size through an application interface of the user device. A connection between the user device and a nearest server is established. Further, the coupling comprises steps of displaying results of the speed test via the application interface.

The foregoing general description of the illustrative embodiments and the following detailed description thereof are merely exemplary aspects of the teachings of this disclosure, and are not restrictive.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes the disclosure of electrical components, electronic components or circuitry commonly used to implement such components.

Figure 1:
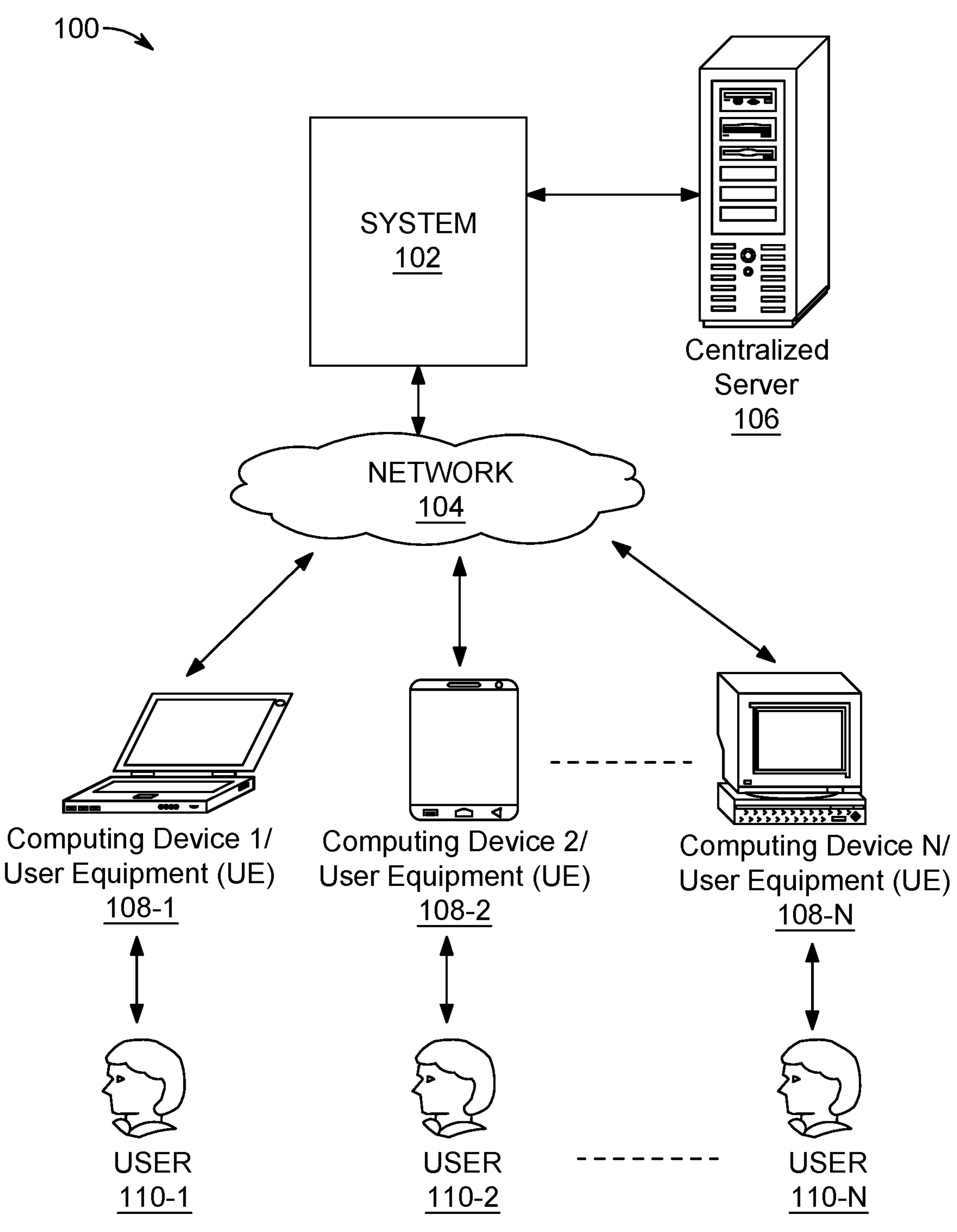
FIG. 1 illustrates an exemplary architecture for employing a system for performing a network speed test, in accordance with embodiments of the present disclosure.

The foregoing shall be more apparent from the following more detailed description of the disclosure.

LIST OF REFERENCE NUMERALS

100—Network Architecture
102—System
104—Network
106—Centralized Server
108-1, 108-2 . . . 108-N—User Equipments
110-1, 110-2 . . . 110-N—Users
202—One or more processor(s)
204—Memory
206—A Plurality of Interfaces
208—Processing Engine
210—Data Acquisition Module
212—Micro Service Module
214—Calculation Module
216—Other Module(s)
218—Database
610—External Storage Device
620—Bus
630—Main Memory
640—Read Only Memory
650—Mass Storage Device
660—Communication Port
670—Processor

DETAILED DESCRIPTION OF DISCLOSURE

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive in a manner similar to the term "comprising" as an open transition word without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present disclosure serves the purpose of a speed test which is to empower users with the ability to measure, evaluate, and understand the performance of their internet connection. Thus, enabling to make informed decisions and ensure they receive reliable and satisfactory internet service.

The various embodiments throughout the disclosure will be explained in more detail with reference to FIGS. 1-6.

FIG. 1 illustrates an exemplary architecture 100 for employing a system (102) for performing a network speed test, in accordance with embodiments of the present disclosure. In an aspect, the speed test may be performed by a mobile application.

Referring to FIG. 1, the system 102 will be connected to a network 104, which is further connected to at least one computing devices 108-1, 108-2, . . . 108-N (collectively referred as computing device 108, herein) associated with one or more users devices 110-1, 110-2, . . . 110-N (collectively referred as computing device 110, herein). The computing device 108 may be personal computers, laptops, tablets, wristwatch or any custom-built computing device integrated within a modern diagnostic machine that can connect to a network as an IoT (Internet of Things) device. Further, the network 104 can be configured with a centralized server 112 that stores compiled data.

In an embodiment, the system 102 may receive at least one input data from the at least one computing devices 108. A person of ordinary skill in the art will understand that the at least one computing devices 108 may be individually referred to as computing device 108 and collectively referred to as computing devices 108. In an embodiment, the computing device 110 may also be referred to as User Equipment (UE). Accordingly, the terms "computing device" and "User Equipment" may be used interchangeably throughout the disclosure.

In an embodiment, the computing device 108 may transmit the at least one captured data packet over a point-to-point or point-to-multipoint communication channel or network 104 to the system 102.

In an embodiment, the computing device 108 may involve collection, analysis, and sharing of data received from the system 102 via the communication network 104.

In an exemplary embodiment, the communication network 104 may include, but not be limited to, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. In an exemplary embodiment, the communication network 104 may include, but not be limited to, a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof.

In an embodiment, the one or more computing devices 108 may communicate with the system 102 via a set of executable instructions residing on any operating system. In an embodiment, the one or more computing devices 108 may include, but not be limited to, any electrical, electronic, electro-mechanical, or an equipment, or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the one or more computing devices 108 may include one or more in-built or externally coupled accessories including, but not limited to, a visual aid device such as camera, audio aid, a microphone, a keyboard, input devices such as touch pad, touch enabled screen, electronic pen, receiving devices for receiving any audio or visual signal in any range of frequencies, and transmitting devices that can transmit any audio or visual signal in any range of frequencies. It may be appreciated that the one or more computing devices 108 may not be restricted to the mentioned devices and various other devices may be used.

A layout of the output end of the system 102 is described, as it may be implemented. The system 100 can be configured to measure speed test through a mobile application to allow measure speed of given network over HTTP network using TCP protocol sending data packet. A user interface of a mobile application provides a user-friendly interface to initiate and display the results of the speed test. It includes options to start the test, view test history, and access additional settings. A test initialization discloses when the user initiates a speed test, the application establishes a connection with a server designated for speed testing purposes. The server is usually located in a data center with a robust internet connection. Server selection method based on client geographical location and network site location (MCC, MNC and Cell ID). Further, the data transfer includes initiation of the speed test application by transferring a predefined amount of data packet between the mobile device and the server over HTTP network using TCP Protocol for predefine time interval. The time interval and data packet size define as per network type. A calculation module can be based on the amount of data transferred and the time taken, the application calculates the upload and download speeds. It may use different units such as Mbps (megabits per half second) to represent the speed.

Speed = Data transmitted/Time Taken.

Finally, the Results Presentation is initiated once the speed test is complete, the application presents the measured upload and download speeds to the user. It may also display additional metrics, such as latency or ping time. The proposed invention can be applicable to 2G, 3G, 4G, 5G, 6G and beyond all generation of mobile technology with multiple bands and carriers of telecom operators.

In an embodiment, the mobile application selects appropriate server from a list of available servers. For server selection we used user geographical location, MCC, MNC and CELLID (if available). Further, the application initiates the data transfer by sending and receiving packets of data to and from the server. The data size and duration of the test can vary, but larger sample sizes generally provide more accurate results so for that we are running multiple thread with increasing buffer size during the test time. The application measures the time it takes for the data transfer to complete in both the upload and download directions. This timing is crucial for determining the speeds.

In an embodiment, the system is connected to a network 104, which is connected to the at least one computing device 110 may include but not limited to personal computers, smartphones, laptops, tablets, smart watches as well as other IoT devices that support a display. When this output is received via the network 104, the receiver can understand speed of the network predicated by the system 102, as well as take steps to prevent further degradation of speed of the network based on suggested recommendations.

In an embodiment, the network 104 is further configured with a centralized server 112 including a database, where all output is stored as part of medical records of the patient. It can be retrieved whenever there is a need to reference this output in future.

In an embodiment, the computing device 108 associated with the one or more user 110 may transmit the at least one captured data packet over a point-to-point or point-to-multipoint communication channel or network 104 to the system 102.

In an embodiment, the computing device 108 may involve collection, analysis, and sharing of data received from the system 102 via the communication network 104.

Although FIG. 1 shows exemplary components of the network architecture 100, in other embodiments, the network architecture 100 may include fewer components, different components, differently arranged components, or additional functional components than depicted in FIG. 1. Additionally, or alternatively, one or more components of the network architecture 100 may perform functions described as being performed by one or more other components of the network architecture 100.

Figure 2:
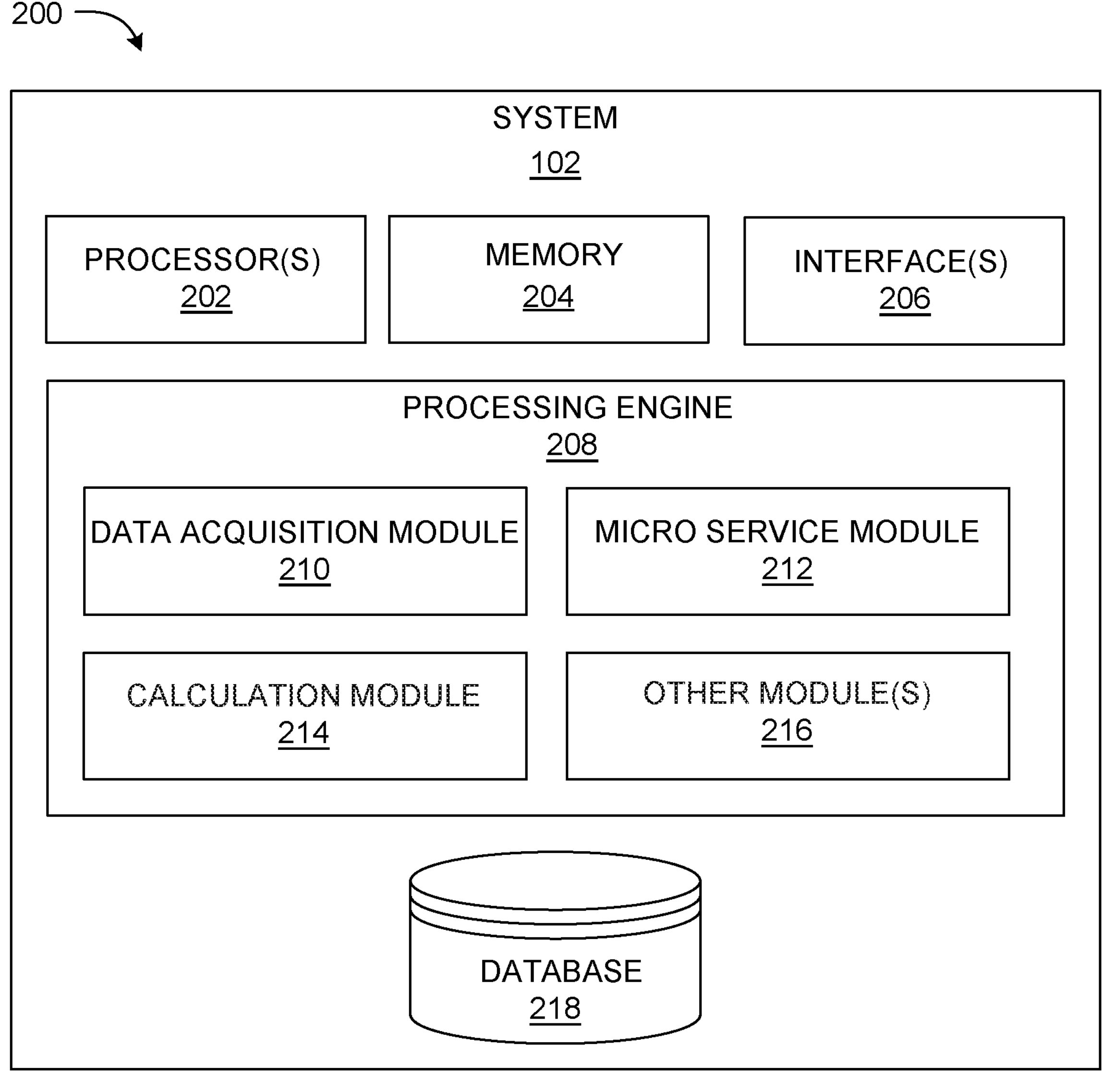
FIG. 2 illustrates an exemplary a micro service-based architecture of the system 102, in accordance with embodiments of the present disclosure.

FIG. 2 illustrates an exemplary a micro service-based architecture 200 of the system 102, in accordance with embodiments of the present disclosure.

The disclosed micro service-based architecture 200 that ensures selection of suitable and optimized radio node for serving UE as per the service requirement scope.

FIG. 2 with reference to FIG. 1, illustrates an exemplary representation of the system for enabling speed test of internet connection using mobile application, in accordance with an embodiment of the present disclosure.

In an aspect, the system 102 may comprise one or more processor(s) 202. The one or more processor(s) 202 may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) 202 may be configured to fetch and execute computer-readable instructions stored in a memory 204 of the system 102. The memory 204 may be configured to store one or more computer-readable instructions or routines in a non-transitory computer readable storage medium, which may be fetched and executed to create or share data packets over a network service. The memory 204 may comprise any non-transitory storage device including, for example, volatile memory such as Random Access Memory (RAM), or non-volatile memory such as Erasable Programmable Read-Only Memory (EPROM), flash memory, and the like.

Referring to FIG. 2, the system 102 may include an interface(s) 206. The interface(s) 206 may comprise a variety of interfaces, for example, interfaces for data input and output devices, referred to as I/O devices, storage devices, and the like. The interface(s) 206 may facilitate communication to/from the system 102. The interface(s) 206 may also provide a communication pathway for one or more components of the system 102. Examples of such components include, but are not limited to, processing unit/engine(s) 208 and a local database 218.

In an embodiment, the processing unit/engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor-executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the system 102 may comprise the machine-readable storage medium storing the instructions and the processing resource to execute the instructions, or the machine-readable storage medium may be separate but accessible to the system 102 and the processing resource. In other examples, the processing engine(s) 208 may be implemented by electronic circuitry.

In an embodiment, the local database 218 may comprise data that may be either stored or generated as a result of functionalities implemented by any of the components of the processor 202 or the processing engines 208. In an embodiment, the local database 218 may be separate from the system 102.

In an exemplary embodiment, the processing engine 208 may include one or more engines selected from any of a data acquisition module 210, a micro service module 212, a calculation module 214, and other modules 216 having functions that may include but are not limited to testing, storage, and peripheral functions, such as wireless communication unit for remote operation, audio unit for alerts and the like.

Figure 3:
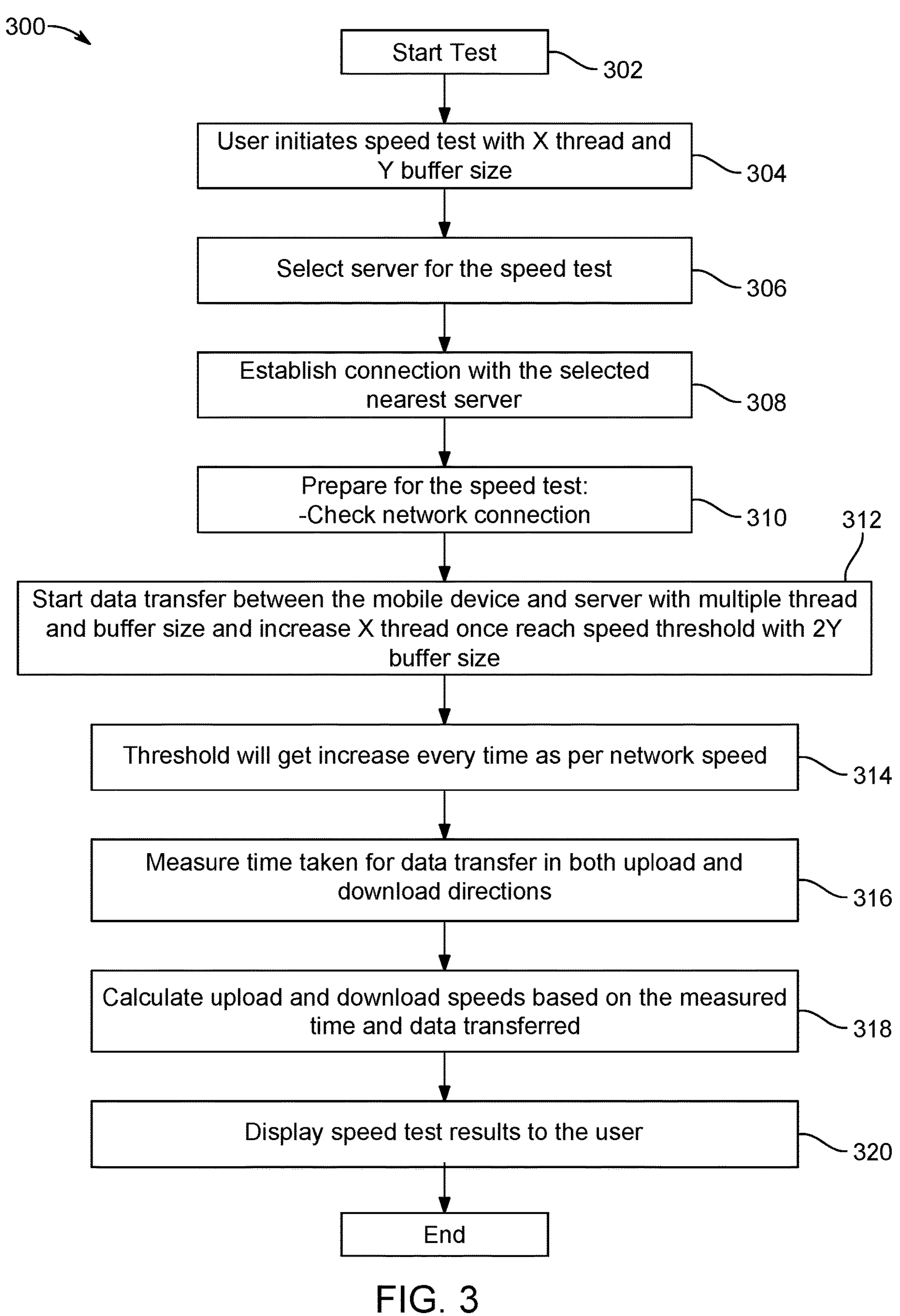
FIG. 3 illustrates an exemplary workflow diagram for enabling speed test of internet connection using the mobile application, in accordance with embodiments of the present disclosure.

FIG. 3 illustrates an exemplary workflow diagram (method) 300 for enabling speed test of internet connection using the mobile application, in accordance with embodiments of the present disclosure.

At step (302), the system is configured to initiate the test.

At step (304), the user initiates the speed test with X number of threads and Y buffer size.

In an aspect, the thread is an independent flow of control that operates within the same address space as other independent flows of controls within a process. The buffer size is a chunk of memory that stores packets temporarily when there is too much data sent to a network interface than what can be transmitted on the physical medium of the network interface.

For example, number of threads X=4 and buffer size Y=20 Mb. When Speed threshold reaches=20 Mbps, number of threads X=8 and buffer size Y=40 Mb.

Further, at step (306), the system is configured to select server for the speed test.

At step (308), the system is configured to establish a connection is with selected nearest server.

At step (310), the system is configured to prepare for the speed test and check the network connection.

At step (312), the system is configured to start data transfer between the mobile device and server with multiple threads and buffer sizes and increase X thread once it reaches the speed threshold with a 2Y buffer size. For example, an initial number of threads X=2, and the initial buffer size Y=30 MB is set for testing with a threshold of 29 Mbps. When the speed threshold reaches=39 Mbps, the number of threads is increased from 2 to 4 with the buffer size 2Y=60 MB.

At step (314), the threshold increases every time as per networks speed.

At step (316), the system is configured to measure the time taken for data transfer in both upload and download directions.

Further, at step (318), the system is configured to calculate upload and download speed based on the measured time and data transfer.

At step (320), the system is configured to display test results to the user.

In an embodiment, network coverage, capacity, and quality are evaluated with the help of the speed test, analysing overall user experience. This allows network operators to optimize their infrastructure and offer better service to customers.

Figure 4:
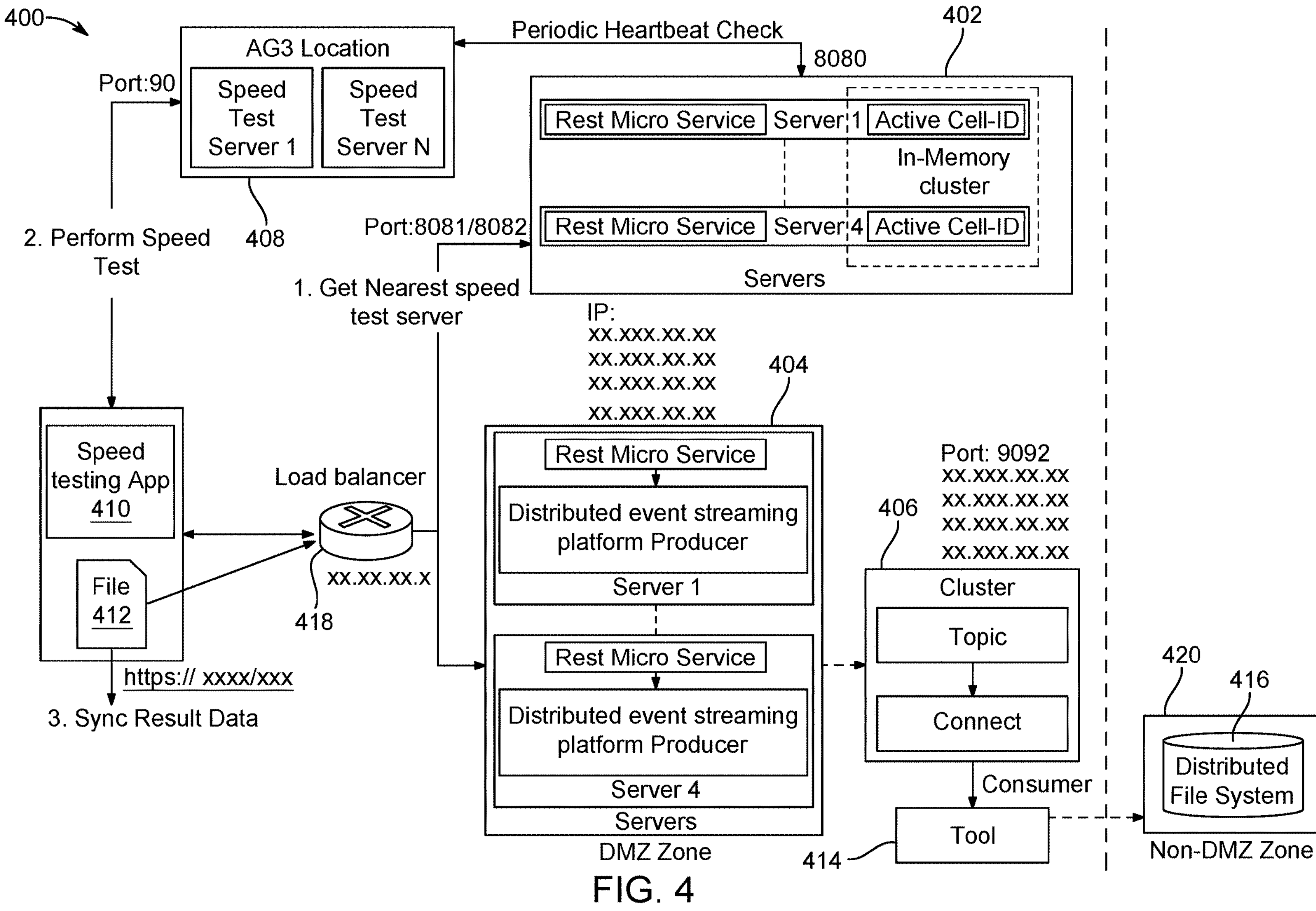
FIG. 4 illustrates an exemplary architecture for speed test, in accordance with embodiments of the present disclosure.

FIG. 4 illustrates an exemplary architecture 400 for speed test, in accordance with embodiments of the present disclosure.

The architecture 400 comprises plurality of servers (402), a speed testing app (410), a tool (414), a load balancer (418), a plurality of speed test servers (408) (408), a demilitarized (DMZ) zone (404), Non-DMZ zone (420). The servers may comprise rest microservice, active cell-ID. In-memory cluster may comprise active cell-IDs of the servers. The DMZ zone (404) comprises plurality of server comprising of rest micro service and distributed event streaming platform. The Non-DMZ zone (420) comprises a distributed file system (DFS) (416).

In an aspect, the speed testing app (410) may be used to provide functionality to end-user to conduct speed test, and measure and analyse the network conditions. It runs throughput test to measure upload/download speeds, latency and jitter providing an overall network health index.

The user equipment may be configured to initiate a speed measurement request. In an example, a user may be configured to initiate the speed measurement request via speed testing app (410) installed in the user equipment. In some examples, the speed test mobile application may be a software or a mobile application from an application distribution platform. Examples of application distribution platforms include the App Store for iOS provided by Apple, Inc., Play Store for Android OS provided by Google Inc., and such application distribution platforms. For example, the speed testing app (410) may have access to a number of parameters associated with the user equipment, such as the current location of the user equipment and files stored within the user equipment.

A memory of the user equipment is configured to store program instructions. The memory is configured to store the data received from the speed testing app (410). The program instructions include a program that implements a method to initiate the network speed test in accordance with embodiments of the present disclosure and may implement other embodiments described in this specification. The memory may be configured to store pre-processed data. The memory may include any computer-readable medium known in the art including, for example, volatile memory, such as Static Random Access Memory (SRAM) and Dynamic Random Access Memory (DRAM) and/or non-volatile memory, such as Read Only Memory (ROM), erasable programmable ROM, flash memories, hard disks, optical disks, and magnetic tapes.

In an aspect, the speed testing app (410) may be configured to, via a processing unit, fetch and execute computer-readable instructions stored in the memory of the UE. The processing unit may be configured to execute a sequence of instructions of the method to initiate the network speed test, which may be embodied in a program or software. The instructions can be directed to the processing unit, which may subsequently program or otherwise be configured to implement the methods of the present disclosure. In some examples, the processing unit is configured to control and/or communicate with large databases, perform high-volume transaction processing, and generate reports from large databases. The processing unit may be implemented as one or more microprocessors, microcomputers, microcontrollers, digital signal processors, central processing units, state machines, logic circuitries, and/or any devices that manipulate signals based on operational instructions.

The distributed file system (DFS) (416) is a file system that spans across multiple file servers or multiple locations, such as file servers that are situated in different physical places. Files are accessible just as if files were stored locally, from any device and from anywhere on the network.

The demilitarized (DMZ) zone (404) is a perimeter network that protects and adds an extra layer of security to internal local-area network from untrusted traffic.

The load balancer (418) may use for load balancing. The load balancing refers to efficiently distributing incoming network traffic across a group of backend servers. The load balancer (418) is configured to receive the request initiated by the user equipment. The load balancer (418) may be configured to distribute incoming speed measurement request(s) across the plurality of servers (402), ensuring no single server is overburdened. The load balancer (418)) may be configured to distribute incoming network traffic across the plurality of servers (402). The load balancer (418) may be configured to adjust the distribution of requests dynamically to ensure optimal resource utilization. The load balancer (418) is configured to monitor the health and performance of each server and directs incoming speed measurement request(s) based on a set of algorithms (round-robin, least connections, etc.). The load balancer (418) is configured to determine a server (402) based on a number of parameters and forward the received speed measurement request to the determined server (402). In an example, the number of parameters may include number of active requests serving by each application server (406), and a threshold of requests to be served.

In an operative aspect, the server (402) is configured to receive the speed measurement request from the speed testing app (410). The server (402) is configured to select the nearest speed test server (408) based on the geographical location of the user device and the network site location. In an example, the server (402) is configured to first check, via an application programming interface (API), the latitude and longitude data in the 'in-memory cluster' (cache memory of the server(s) such that a recently connected testing server may be assigned. Further, the server (402) may respond back to the load balancer (418) and the user equipment with details of the selected speed test server (408).

In an operative aspect, the server (402) is configured to employ periodic heartbeat checks to ensure the reliability of the system. This mechanism continuously monitors the health of the speed test servers (408), verifying that each test server is functional and ready to handle new requests.

The plurality of speed test servers (408) is configured to receive the request from the server (402) and is further configured to execute the speed measurement request. The speed test server (408) may be used to measure the speed of the network in which the user equipment resides. The speed test server (408) may be configured to simulate various network conditions to evaluate the speed and responsiveness of the system (102). The speed test server (408) may be further configured to collect and analyze performance metrics, such as latency, throughput, and response times. The speed test server (408) may be configured to offer a standardized environment for users to assess their network or application performance. After executing the speed measurement request, the selected speed test server (408) may be configured to generate at least one speed test information (result test). In an aspect, the at least one speed test information may include a measured downlink (DL) speed and/or a measured uplink (UL) speed. In an example, the speed test server (408) may be configured to transmit the at least one speed test information (result test) to the user equipment (402) via the speed testing app (410). For example, the plurality of speed test servers (408) may reside in a remote location connected via an A3G (Access Gateway 3). The Access Gateway (AG) plays a crucial role in connecting the user equipment to the 5G core network. In an example, the AG3 may be an access gateway within the network infrastructure, responsible for handling UE connectivity and routing traffic. In an embodiment, the speed test includes several steps.

Step 1: Scheduled speed test on user device to request for nearest speed test server along with latched MN C-CELLID.

Step 2: The API first checks MN C-CELLID in "In-Memory cluster", if found then responds with NO SPEED TEST REQUIRED", else inserts the MNC-CELL in the cluster with TTL of defined time (e.g., 2 minutes). Also, respond back with Speed test server details.

Step 3: After completion of test, result data is synchronized by data sync API to the severs. JSON based data structure to be used for test result captured.

Step 4: The producer places the data into distributed event streaming platform.

Step 5: The distributed event streaming platform may connect to consume the data and directly store it in the DFS (416) with date wise partition.

Step 6: Hive table to be created on the DFS (416) partitioned data for further use cases and reporting.

In an embodiment, server selection method based on client geographical location and network site location (MCC, MNC and Cell ID).

In system and method to measure speed test for network bandwidth running multiple thread and bandwidth. started with X thread and increase thread and buffer with 2× each time once reach speed threshold between test time intervals.

Like threshold=TS, Thread=X thread, Bandwidth=Y bandwidth

Once cross threshold next threshold=2TS, Thread=2× and bandwidth=2Y

FIGS. 5A-5E illustrate an exemplary user interface 500 of the mobile application configured to perform the speed test, in accordance with embodiments of the present disclosure.

In an embodiment, FIGS. 5A-5E disclose the user interface 500 representing the speed test of the internet connection.

Figure 5C:
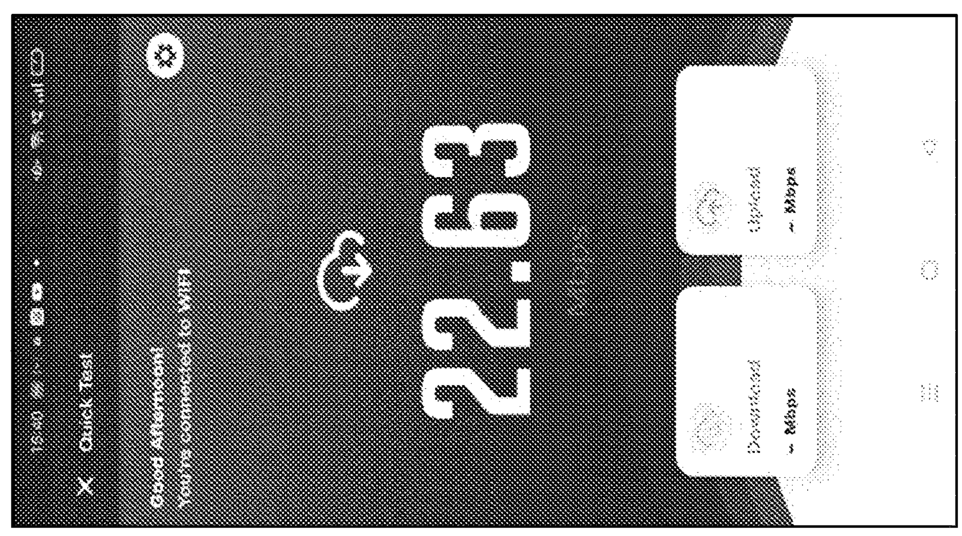
FIGS. 5A-5E illustrate an exemplary user interface representing speed test using the mobile application, in accordance with embodiments of the present disclosure.
Figure 5B:
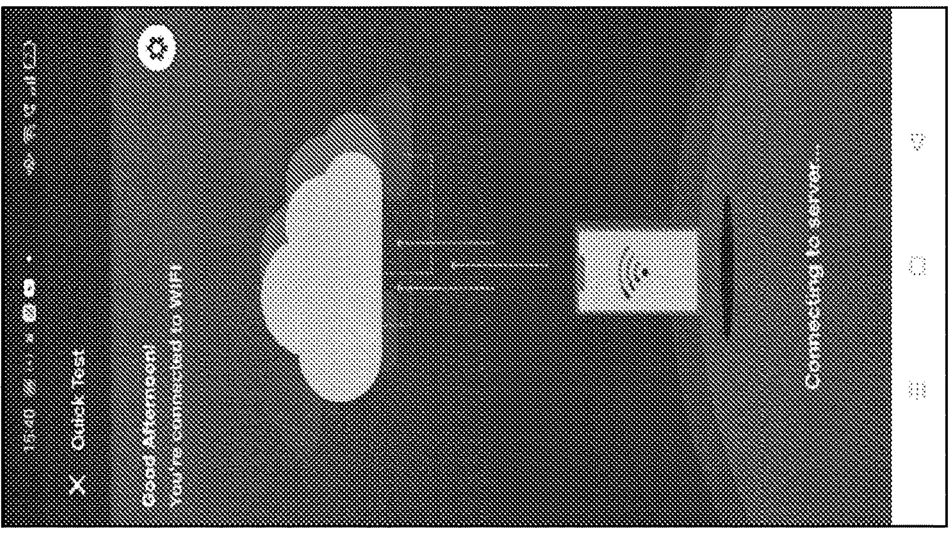
Figure 5A:
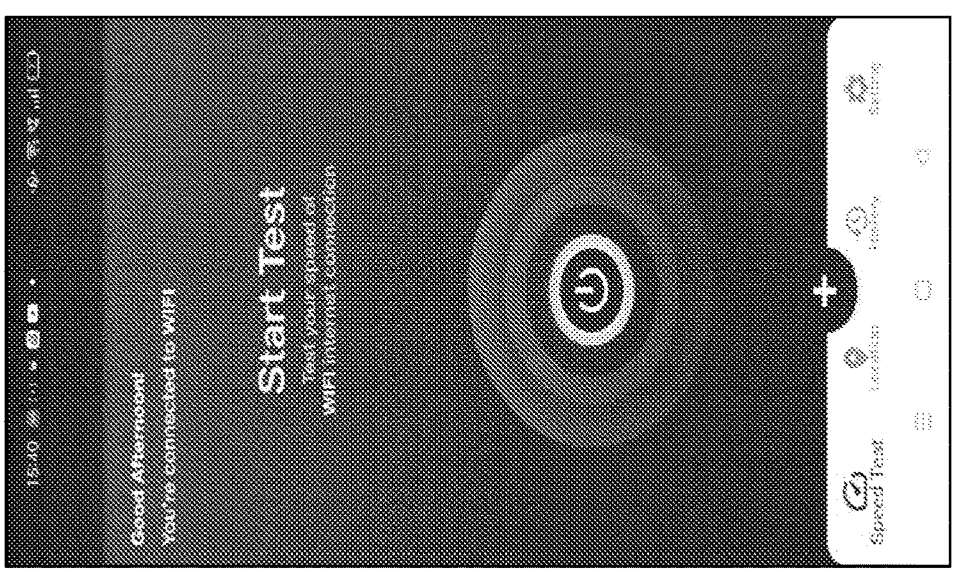

FIG. 5A represents a home page of the mobile application from where the speed test can be started. The home page of the mobile application is typically the first screen or landing page that users encounter when they open the app. It serves as the main entry point and provides an overview of the app's features, functionalities, and content. As illustrated in FIG. 5A, providing an option to start speed test. The speed test used to test speed of Wi-Fi internet connection.

FIG. 5B represents a latency test page of the mobile application from where the latency test can be started. The latency measures the delay or latency between the user device and the server or destination on the internet. As illustrated in FIG. 5B, showing connection to the server.

FIG. 5C represents a download speed test page of the mobile application from where the download speed test can be started. The download speed test measures the speed at which data can be downloaded from the internet to the user device. The download speed test helps in determining the rate at which the internet connection can transfer data and is typically measured in megabits per second (Mbps) or kilobits per second (Kbps). As illustrated in FIG. 5C, showing a download speed measurement (e.g., 22.63 Mbps).

Figure 5E:
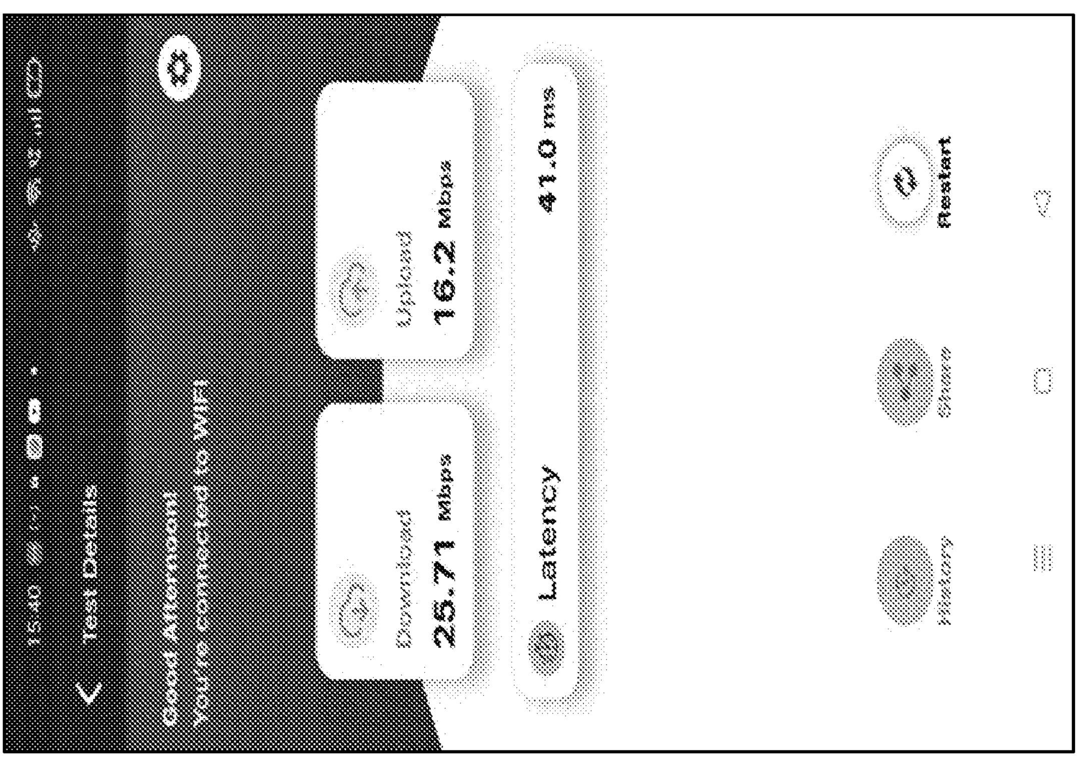
Figure 5D:
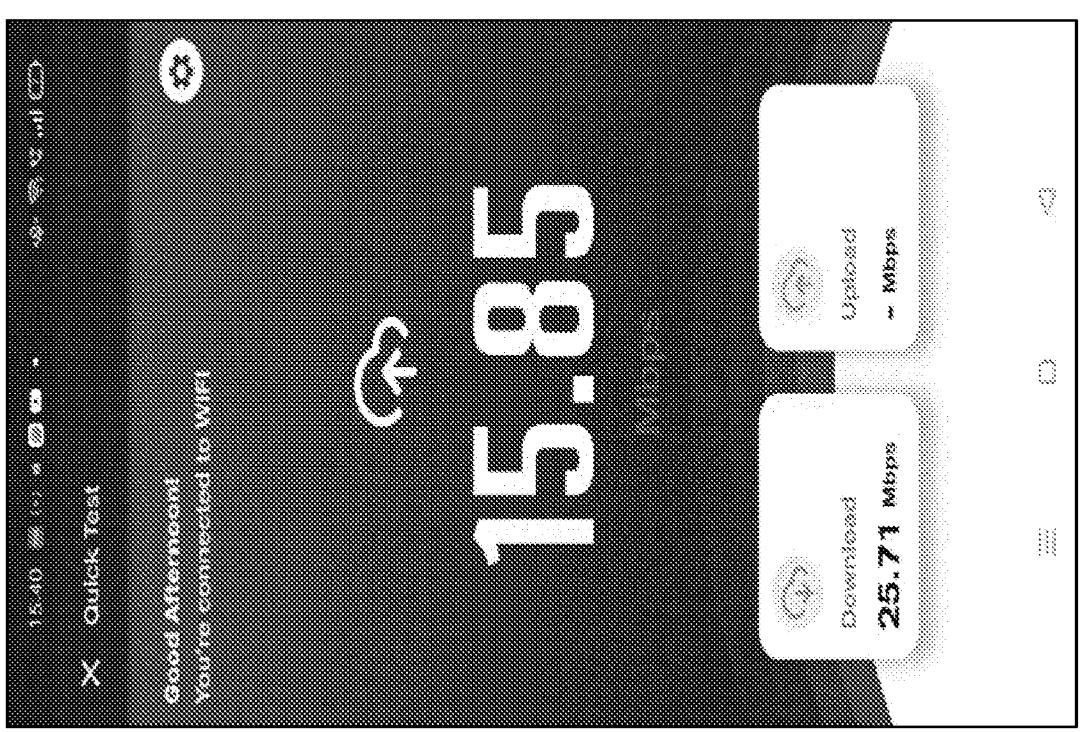

FIG. 5D represents an upload speed test page of the mobile application from where the upload speed test can be started. The upload speed test measures the speed at which data can be uploaded from your device to the internet. As illustrated in FIG. 5D, showing an upload speed measurement (e.g., 15.85 Mbps).

FIG. 5E represents a speed test result page of the mobile application. As illustrated in FIG. 5E, the speed test result (e.g., download speed=25.71 Mbps, upload speed=16.2 Mbps, latency=41.0 ms.

Figure 6:
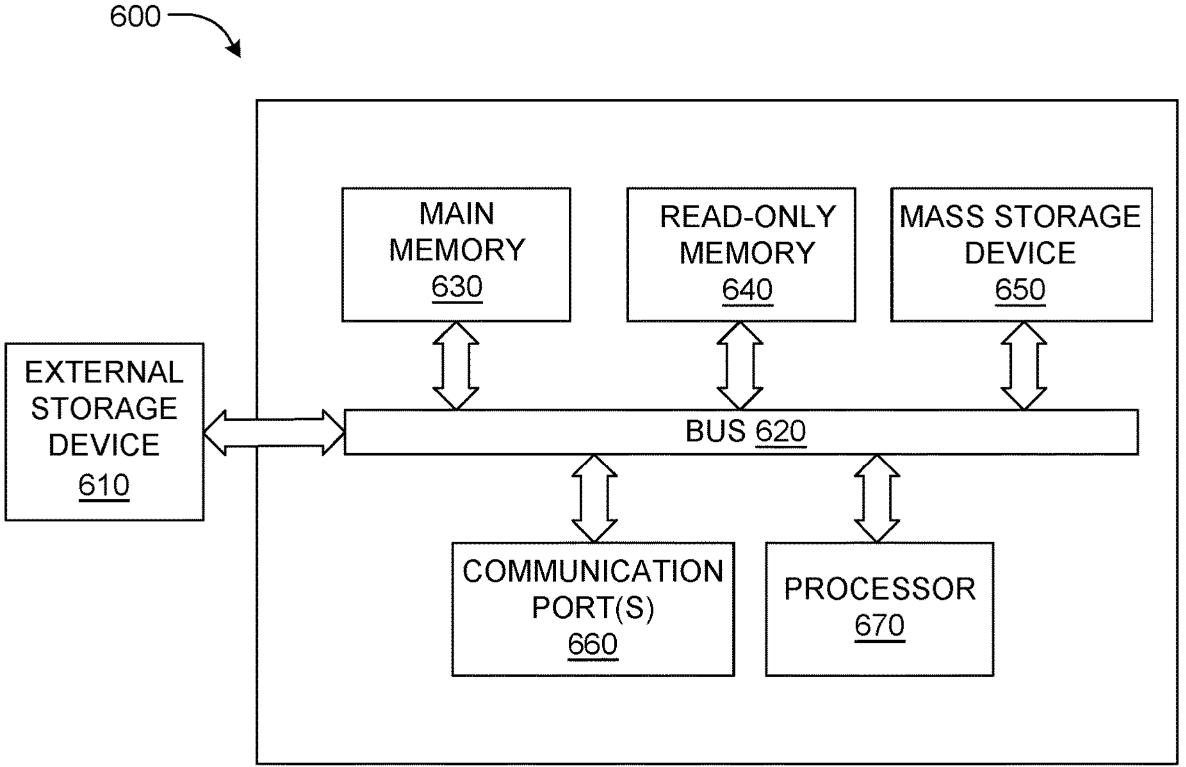
FIG. 6 illustrates an exemplary computer system 600 in which or with which embodiments of the present disclosure may be implemented.

FIG. 6 illustrates an exemplary computer system 600 in which or with which embodiments of the present disclosure may be implemented.

As shown in FIG. 6, the computer system 600 may include an external storage device 610, a bus 620, a main memory 630, a read-only memory 640, a mass storage device 650, communication port(s) 660, and a processor 670. A person skilled in the art will appreciate that the computer system 600 may include more than one processor and communication ports. The processor 670 may include various modules associated with embodiments of the present disclosure. The communication port(s) 660 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 660 may be chosen depending on a network, such a Local Area Network (LAN), Wide Area Network (WAN), or any network to which the computer system 600 connects. The main memory 630 may be random access memory (RAM), or any other dynamic storage device commonly known in the art. The read-only memory 640 may be any static storage device(s) including, but not limited to, a Programmable Read Only Memory (PROM) chips for storing static information e.g., start-up or basic input/output system (BIOS) instructions for the processor 670. The mass storage device 650 may be any current or future mass storage solution, which may be used to store information and/or instructions.

The bus 620 communicatively couples the processor 670 with the other memory, storage, and communication blocks. The bus 620 can be, e.g. a Peripheral Component Interconnect (PCI)/PCI Extended (PCI-X) bus, Small Computer System Interface (SCSI), universal serial bus (USB), or the like, for connecting expansion cards, drives, and other subsystems as well as other buses, such a front side bus (FSB), which connects the processor 670 to the computer system 600.

Optionally, operator and administrative interfaces, e.g. a display, keyboard, and a cursor control device, may also be coupled to the bus 620 to support direct operator interaction with the computer system 600. Other operator and administrative interfaces may be provided through network connections connected through the communication port(s) 660. In no way should the aforementioned exemplary computer system 600 limit the scope of the present disclosure.

In another exemplary embodiment, a user device (108) for performing a network speed test is described. The user device (108) is communicatively coupled to a system. The coupling comprises steps of initiating a speed test with a number of threads and a buffer size through an application interface of the user device. A connection between the user device (108) and a nearest server is established. Further, the coupling comprises steps of displaying results of the speed test via the application interface. The system (102) is suitably described in view of FIG. 1-FIG. 6.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter to be implemented merely as illustrative of the disclosure and not as limitation.

ADVANTAGES OF THE PRESENT DISCLOSURE

The present disclosure provides a system and method for enabling speed test of internet connection using mobile application.

The present disclosure assesses the performance of internet connection by measuring the download and uploads speeds, as well as factors such as latency and jitter.

The present disclosure facilitates in comparing the speeds and performance of various providers, an informed decision about the most suitable option for the user's requirement can be made.

The present disclosure determines the issue persisting in the internet connection.

We claim:

1. A method (300) for performing a network speed test, the method comprising:

initiating (304), by a user, the speed test with a number of thread and a buffer size through an application interface of a user device (108);

selecting (306), by a processing engine (210), a nearest server from a list of servers based on geographical location of the user device (108) and a network site location, wherein the network site location is determined based on a mobile country code (MCC), a mobile network code (MNC) and cell identity (ID);

establishing (308), by the processing engine (210), a connection between the selected server and the user device (108);

preparing (310), by the processing engine (210), for the speed test by checking a network connection;

starting (312), by a micro service module (212), transfer of a defined amount of data packets between the user device (108) and the selected server with a plurality of threads and buffer sizes for a defined time interval;

on reaching a speed threshold between the time interval, increasing (314), by the processing engine (210), number of threads with two times of the buffer size;

measuring (316), by a calculation module (214), a time taken for transfer of data packets in an upload direction and a download direction;

calculating (318), by the calculation module (214), an upload speed and a download speed based on the measured time and transferred data, wherein a throughput and latency of connected network is measured; and displaying (320), by the processing engine (210), results of speed test at the user device (108) via the application interface, wherein the results of the speed test include the upload speed, the download speed, the throughput, and the latency.

2. The method (300) claimed as in claim 1, wherein the speed threshold is increased according to network speed.

3. The method (300) claimed as in claim 1, wherein the time interval and size of data packets are defined according to network type.

4. The method (300) claimed as in claim 1 further comprising evaluating, by the processing engine (210), a plurality of network parameters, wherein the plurality of network parameters includes network coverage, network capacity, and quality.

5. The method (300) claimed as in claim 1, wherein the speed is defined by data transmitted/time taken for transfer of data packets.

6. A system (102) for performing a network speed test comprising:

a user device (108) configured to initiate the speed test with a number of threads and a buffer size through an application interface of the user device (108);

the processing engine (210) configured to select a nearest server from a list of servers based on geographical location of the user device (108) and a network site location, wherein the network site location is determined based on a mobile country code (MCC), a mobile network code (MNC) and cell identity (ID);

the processing engine (210) configured to establish a connection between the selected server and the user device (108);

the processing engine (210) configured to prepare for the speed test by checking a network connection;

a micro service module (212) configured to start transfer of a defined amount of data packets between the user device (108) and the selected server with a plurality of threads and buffer sizes for a defined time interval, wherein on reaching a speed threshold between the time interval, the processing engine (210) configured to increase number of threads with two times of the buffer size;

a calculation module (214) configured to measure a time taken for transfer of data packets in an upload direction and a download direction;

the calculation module (214) configured to calculate an upload speed and a download speed based on the measured time and transferred data, wherein a throughput and latency of connected network is measured; and the processing engine (210) configured to display results of the speed test at the user device (108) via the application interface, wherein the results of the speed test include the upload speed, the download speed, the throughput, and the latency.

7. The system (102) claimed as in claim 6, wherein the speed threshold is increased according to network speed.

8. The system (102) claimed as in claim 6, wherein the time interval and size of data packets are defined according to network type.

9. The system (102) claimed as in claim 6, the processing engine (210) further configured to evaluate a plurality of network parameters, wherein the plurality of network parameters includes network coverage, network capacity, and quality.

10. The system (102) claimed as in claim 6, wherein the speed is defined by data transmitted/time taken for transfer of data packets.

11. A user device (108) communicatively coupled to a system (102), said coupling comprises steps of:

initiating a speed test with a number of threads and a buffer size through an application interface of the user device (108), wherein a connection between the user device (108) and a nearest server is established; and displaying results of the speed test via the application interface, wherein the system (102) configured for performing the speed test claimed as in claim 6.

12. A computer program product comprising a non-transitory computer-readable medium comprising instructions that, when executed by one or more processors, cause the one or more processors to:

initiate the speed test with a number of threads and a buffer size through an application interface of a user device (108);

select a nearest server from a list of servers based on geographical location of the user device (108) and a network site location, wherein the network site location is determined based on a mobile country code (MCC), a mobile network code (MNC) and cell identity (ID);

establish a connection between the selected server and the user device (108);

prepare for the speed test by checking a network connection;

start transfer of a defined amount of data packets between the user device (108) and the selected server with a plurality of threads and buffer sizes for a defined time interval, wherein on reaching a speed threshold between the time interval, increasing number of threads with two times of the buffer size;

measure a time taken for transfer of data packets in an upload direction and a download direction;

calculate an upload speed and a download speed based on the measured time and transferred data, wherein a throughput and latency of connected network is measured; and display results of speed test at the user device (108) via the application interface, wherein the results of the speed test include the upload speed, the download speed, the throughput, and the latency.

* * * * *